United States Patent Office 3,717,654
Patented Feb. 20, 1973

---

3,717,654
**2,5,6,7 - TETRAHYDRO-3H-s-TRIAZOLO[4,3-d][1,4]
BENZODIAZEPIN - 3-ONE COMPOUNDS AND
THEIR PRODUCTION**
Jackson B. Hester, Jr., Galesburg, Mich., assignor to The
Upjohn Company, Kalamazoo, Mich.
No Drawing. Filed Sept. 30, 1971, Ser. No. 185,380
Int. Cl. C07d 57/00
U.S. Cl. 260—308 C    6 Claims

ABSTRACT OF THE DISCLOSURE 2,5,6,7-tetrahydro-7-alkyl-3H - s-triazolo[4,3-d][1,4]
benzodiazepin-3-ones of the Formula II

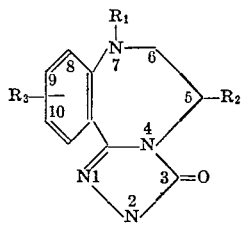

wherein $R_1$ is alkyl of 1 to 3 carbon atoms, inclusive;
wherein $R_2$ is hydrogen or alkyl defined as above; wherein
$R_3$ is selected from the group consisting of hydrogen,
alkyl as defined above, alkoxy of 1 to 3 carbon atoms;
fluoro, chloro, bromo, iodo, nitro, cyano, trifluoromethyl,
and alkylthio of 1 to 3 carbon atoms, inclusive, is produced by heating a 1-alkyl-5-alkoxy-2,3-dihydro-1H-1,4-benzodiazepine I

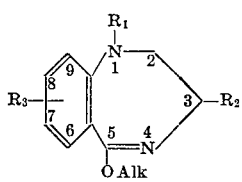

with a lower alkyl carbazate, e.g., ethyl carbazate.

The compounds II and pharmacologically acceptable
acid addition salts thereof are useful as tranquilizers and
sedatives in mammals and poultry.

BACKGROUND OF THE INVENTION

Field of the invention

This invention is directed to new organic compounds
and is particularly concerned with novel 2,5,6,7-tetrahydro-7-alkyl - 3H-s - triazolo[4,3-d][1,4]benzodiazepin-3-ones and a process of production thereof.

The novel compounds and process of production therefor can be illustratively represented as follows:

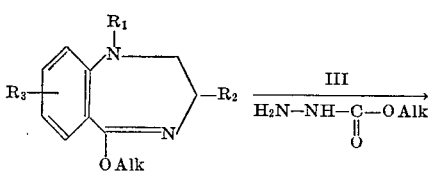

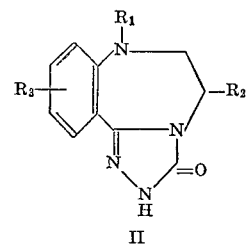

wherein $R_1$ is alkyl of 1 to 3 carbon atoms, inclusive;
wherein $R_2$ is hydrogen or alkyl defined as above; wherein
$R_3$ is selected from the group consisting of hydrogen,
alkyl as defined above, alkoxy of 1 to 3 carbon atoms,
fluoro, chloro, bromo, iodo, nitro, cyano, trifluoromethyl
and alkylthio of 1 to 3 carbon atoms, inclusive, and
wherein Alk is alkyl defined as above.

The process of this invention involves: heating between 60–120° C. a 5-loweralkoxy-2,3-dihydro-1-alkyl-1H-1,4-benzodiazepine I with an alkyl carbazate (II).

DESCRIPTION OF THE PREFERRED EMBODIMENT

Lower alkyl groups of 1 to 3 carbon atoms, inclusive,
are exemplified by methyl, ethyl, propyl, and isopropyl.

The carbon chain moiety of alkoxy and alkylthio is
of 1 to 3 carbon atoms, inclusive, and can be defined as
loweralkyl as above.

The novel compounds of the Formula II and pharmacologically acceptable acid addition salts thereof have
sedative, hypnotic, anticonvulsant, tranquilizing, and
muscle relaxant effects in mammals and birds. Also as
feed additives they increase growth rate and feed efficiency of livestock and poultry.

The pharmacologically acceptable acid addition salts
of compounds of Formula II contemplated in this invention are the hydrochlorides, hydrobromides, hydroiodides,
sulfates, phosphates, cyclohexanesulfamates, methanesulfonates, and the like, prepared by reacting a compound
of Formula II with the selected pharmacologically acceptable acid.

Sedative effects of 10-chloro-2,5,6,7-tetrahydro-7-methyl-3H-s-triazolo[4,3-d][1,4]benzodiazepin-3-one are
shown by the following tests in mice:

Chimney test [Med. Exp. 4, 145 (1961)]

The effective intraperitoneal dosage for 50% of mice
($ED_{50}$) is 126 mg./kg. The test determines the ability of
mice to back up and out of a vertical glass cylinder within 30 seconds. At the effective dosage, 50% of the mice failed doing it.

Dish test

Mice in petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 0.9 mg./kg.

Pedestal test

The untreated mouse leaves the pedestal in less than a minute to climb back to the floor of the standard mouse box. Tranquilized mice will stay on the pedestal for more than 1 minute. The $ED_{50}$ (intraperitoneal administration) is 159 gm./kg.

Nicotine antagonism test

Mice in a group of 6 are injected with the test compound 10-chloro-2,5,6,7 - tetrahydro-7-methyl-3H-s-triazolo[4,3-d][1,4]benzodiazepin-3-one. Thirty minutes later the mice including control (untreated) mice are injected with nicotine salicylate (22 mg./kg.). The control mice show overstimulation, i.e. (1) running convulsions followed by (2) tonic extensor fits; followed by (3) death. An intraperitoneal dosage of 159 mg./kg. of the test compound protected 50% of the mice against (2) and against (3) ($ED_{50}$).

The pharmaceutical forms contemplated by this invention include pharmaceutical compositions suited for oral, parenteral, and rectal use, e.g., tablets, powder packets, cachets, dragés, capsules, solutions, suspension, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring, and flavoring agents may be added.

For mammals and birds food premixes, with starch, oatmeal, dried fishmeat, fishmeal, flour, and the like can be prepared. A quantity of 100 g. to 1000 g. per ton of feed is used to increased the weight or feed efficacy of cattle and poultry or to increase the milk production or egg production.

As tranquilizer the compounds of Formula II and its pharmacologically acid addition salts can be used in dosages of 1-200 mg./kg. in oral or injectable preparations as described above, to alleviate tension and anxiety in mammals, or birds, such as e.g., occurs when animals are in travel.

Other acid addition salts of the compounds of Formula II can be made such as the fluosilicic acid addition salts which are useful mothproofing compounds or the trichloroacetates useful as herbicides against Johnson grass, Bermuda grass, yellow foxtail and green foxtail, and quack grass.

The starting materials of Formula I of this invention, substituted or unsubstituted 1-alkyl-5-alkoxy-2,3-dihydro-1H-1,4-benzodiazepines are prepared as shown in Preparations 1-6.

In carrying out the process of the invention, a selected 1-alkyl-5-alkoxy-2,3-dihydro - 1H - 1,4 - benzodiazepine is heated with an alkyl carbazate of the formula:

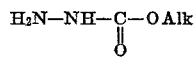

wherein Alk is alkyl of 1 to 3 carbon atoms, inclusive. The alkyl carbazate is preferably used in excess, e.g., 2 to 5 times the stoichiometrically required quantity. In the preferred embodiment of this invention, reactants are dissolved in an organic solvent, e.g., methanol, ethanol, 1- and 2-propanol; 1- and 2-butanol, tetrahydrofuran, benzene, toluene, xylenes and the like, and heated to between 60–120° C., preferably to the reflux temperature of the mixture for a period of 2–48 hours, preferably in a nitrogen atmosphere. The product of Formula II, a 2,5,6,7-tetrahydro-7-alkyl - 3H-s - triazolo[4,3 - d][1,4]benzodiazepin-3-one (II), is recovered by conventional means, for example, removing the solvent and excess alkyl carbazate in vacuo by distillation. The product (II) is purified by extraction, chromatography or crystallization.

The following preparations and examples are illustrative of the process and products of the present invention, but are not to be construed as limiting.

PREPARATION 1

N-methyl-5-chloroisatoic anhydride

To a solution of 19.76 g. (0.1 mole) of 4-chloroisatoic anhydride in 100 ml. of dimethylformamide was added portionwise, with stirring 43 g. of a 58.6% sodium hydride dispersion in mineral oil (0.105 mole). The mixture was stirred for an hour and then 47.5 g. (0.34 mole) of methyl iodide in 100 ml. of dimethylformamide was added (exothermic). The mixture was refluxed for 5 hours. The dimethylformamide was removed under reduced pressure, water was added and the mixture extracted with chloroform, washed with water, dried and concentrated to a crystalline product. Trituration with ether gave 12.55 g. of N-methyl-5-chloroisatoic anhydride of melting point 198–199.5° C.

*Analysis.*—Calcd. for $C_9H_5ClNO_3$ (percent): C, 51.08; H, 2.86; Cl, 16.76; N, 6.61. Found (percent): C, 51.50; H, 2.93; Cl, 16.89; N, 6.22.

PREPARATION 2

2-methylamino-5-chlorobenzamide

A solution of 12.55 g. of N-methyl-5-chloroisatoic anhydride in 250 ml. of liquid ammonia was allowed to stand at ambient temperature overnight during which time the ammonia evaporated. The residue was recrystallized from 1600 ml. of hot water; yield, 8.45 g. of 2-methylamino-5-chlorobenzamide of melting point 148–149° C.

*Analysis.*—Calcd. for $C_8H_9ClN_2O$ (percent): C, 52.04; H, 4.91; Cl, 19.20; N, 15.18. Found (percent): C, 51.53; H, 5.03; Cl, 19.23; N, 14.58.

PREPARATION 3

2-[N-methyl-N-(2-hydroxyethyl)]-amino-5-chlorobenzamide

To 150 ml. of ethylene oxide in 1100 ml. of glacial acetic acid in an ice bath was added 70.0 g. of 2-methylamino-5-chlorobenzamide. The mixture was stirred at 0–5° C. for 2 hours and then at room temperature for 48 hours. The solution was concentrated to one half volume under reduced pressure and adjusted to pH 8.0 with 10% aqueous sodium hydroxide with cooling. The solution was extracted with ether, dried and concentrated to give 60.2 g. of oil product. The aqueous solution was then extracted with chloroform and concentrated to give 32.4 g., which crystallized and was recrystallized from benzene to yield 6.0 g. of 2-[N-methyl-N-(2-hydroxyethyl)]amino-5-chlorobenzamide of melting point 78–79° C.

*Analysis.*—Calcd. for $C_{10}H_{13}ClN_2O_2$ (percent): C, 52.52; H, 5.73; Cl. 15.51; N, 12.25. Found (percent): C, 52.61; H, 5.83; Cl, 15.58; N, 12.15.

For the next step, preparation of the 2-[N-methyl-N-(2-chloroethyl)]-amino-5-chlorobenzamide, the oily product was used without further purification.

PREPARATION 4

2-[N-methyl-N-(2-chloroethyl)]amino-5-chlorobenzamide

To 850 ml. of thionyl chloride at 0° C. was added 82.0 g. of 2-[N-methyl-N-(2-hydroxyethyl)]amino-5-chlorobenzamide and the solution stirred at 0° for 6 hours and at room temperature overnight. The thionyl chloride was removed under reduced pressure and the syrup washed with 400 ml. of petroleum ether. The residue was dissolved in 300 ml. of water and the pH slowly adjusted to 7 with 10% aqueous sodium hydroxide keeping the solution cool. The solution was extracted with chloroform, dried and concentrated to yield 68 g. of crude material. Crystallization from ethyl acetate-Skellysolve B hexanes gave 29.55 g. of 2-[N-methyl-N-(2-chloroethyl)]amino-5-chlorobenzamide of melting point 111–112.5° C.

*Analysis.*—Calcd. for $C_1H_{12}Cl_2N_2O$ (percent): C, 48.60; H, 4.90; Cl, 28.69; N, 11.34. Found (percent): C, 48.93; H, 5.08; Cl, 27.79; N, 11.27.

A second crop of 12.5 g., melting point 105–107.5°, which is pure by thin layer chromatography (silica gel, ethyl acetate), was obtained upon concentration of the mother liquors.

PREPARATION 5

7-chloro-1,2,3,4-tetrahydro-1-methyl-5H-1,4-benzodiazepin-5-one

To a suspension of 585 mg. of 158.6% sodium hydride dispersion in mineral oil (14.2 millimoles) in 15 ml. of anhydrous benzene was added dropwise with stirring 2.47 g. (10 millimoles) of 2-[N-methyl-N-(2-chloroethyl)]amino-5-chlorobenzamide in 5 ml. of anhydrous benzene. The mixture was then heated at reflux for 3 hours, cooled to room temperature and 10 ml. of benzene saturated with water carefully added. The benzene solution was then washed with water, and concentrated. The resulting solid was crystallized from benzene to yield 790 mg. of 7-chloro-1,2,3,4-tetrahydro-1-methyl-5H-1,4-benzodiazepin-5-one of melting point 183–185° C.

*Analysis.*—Calcd. for $C_1H_{11}ClN_2O$ (percent): C, 57.01; H, 5.26; Cl, 16.83; N, 13.30. Found (percent): C, 57.58; H, 5.34; Cl, 16.66; N, 12.97.

PREPARATION 6

7-chloro-5-ethoxy-2,3-dihydro-1-methyl-1H-1,4-benzodiazepine

Epichlorohydrin (128 g.) was added, under nitrogen, to a stirred solution of freshly distilled boron trifluoride etherate (300 ml.) in ether (725 ml.) at such a rate that the reaction mixture refluxed gently. After the addition, the mixture was refluxed for an additional 1.5 hours and allowed to stand at ambient temperature for 18 hours. The solvent was then removed via a filter stick and the solid was washed several times with dry ether. Residual ether was removed in vacuo and the resulting solid was dissolved in dry methylene chloride (700 ml.) and added to an ice cold suspension of 7-chloro-1,2,3,4-tetrahydro-1-methyl-5H-1,4-benzodiazepin-5-one (145 g., 0.691 mole) in methylene chloride (2.8 l.). This mixture was allowed to stand at ambient temperature for 18 hours. It was then treated with 273 g. of 50% aqueous potassium carbonate. The yellow solution was filtered through a small pad of potassium carbonate and concentrated in vacuo. A suspension of the residue in water and ether was made alkaline with potassium carbonate. The layers were separated and the aqueous layer was extracted with ether. The combined ether solution was washed with brine, dried over anhydrous potassium carbonate and concentrated. A solution of the residue in petroleum ether was filtered through a small pad of silica gel and crystallized at 0° C. to give 102.8 g. (62.2%) of 7-chloro-5-ethoxy-2,3-dihydro-1-methyl-1H-1,4-benzodiazepine of melting point 36.5–38.5° C. The analytical sample of melting point 38.5–39° C. was prepared by recrystallizing some of this material from petroleum ether at 0° C.

*Analysis.*—Calcd. for $C_{12}H_{15}ClN_2O$ (percent): C, 60.37; H, 6.33; Cl, 14.85; N, 11.74. Found (percent): C, 60.53; H, 6.46; Cl, 15.02; N, 11.65.

The hydrochloride salt was prepared by acidifying an ethereal solution of the base with ethereal hydrogen chloride. The analytical sample of melting point 116.5° C. was prepared by recrystallizing the salt from methylene chloride-ethyl acetate.

*Analysis.*—Calcd. for $C_{12}H_{16}Cl_2N_2O$ (percent): C, 52.37; H, 5.86; Cl, 25.77; N, 10.18. Found (percent): C, 52.24; H, 5.89; Cl, 26.15; N, 9.81.

In the same manner illustrated by Preparations 1–6 other 5-alkoxy - 2,3 - dihydro-1H-1,4-benzodiapezines (I) and acid addition salts thereof can be made. Representative starting materials thus produced include:

7-nitro-5-methoxy-2,3-dihydro-1,3-diethyl-1H-1,4-benzodiazepine;
9-cyano-2,3-dihydro-5-ethoxy-1-propyl-1H-1,4-benzodiazepine;
8-fluoro-2,3-dihydro-5-ethoxy-1-isopropyl-1H-1,4-benzodiazepine;
6-bromo-2,3-dihydro-1-methyl-5-propoxy-1H-1,4-benzodiazepine;
7-ethoxy-2,3-dihydro-1,3-dipropyl-5-propoxy-1H-1,4-benzodiazepine;
7-trifluoromethyl-2,3-dihydro-1-methyl-5-ethoxy-1H-1,4-benzodiazepine;
9-methoxy-2,3-dihydro-1-isopropyl-5-ethoxy-1H-1,4-benzodiazepine;
8-propylthio-2,3-dihydro-1-ethyl-3-isopropyl-5-methoxy-1H-1,4-benzodiazepine;
6-iodo-2,3-dihydro-1-methyl-5-methoxy-1H-1,4-benzodiazepine;
6-iodo-2,3-dihydro-1-ethyl-5-propoxy-1H-1,4-benzodiazepine;
9-bromo-2,3-dihydro-1-isopropyl-5-ethoxy-1H-1,4-benzodiazepine;
8-cyano-2,3-dihydro-1-ethyl-5-methoxy-1H-1,4-benzodiazepine;
8-nitro-2,3-dihydro-1-ethyl-5-ethoxy-1H-1,4-benzodiazepine;
9-isopropyl-2,3-dihydro-1-methyl-5-ethoxy-1H-1,4-benzodiazepine;
8-ethyl-2,3-dihydro-1-propyl-5-ethoxy-1H-1,4-benzodiazepine;
and the like.

EXAMPLE 1

10-chloro-2,5,6,7-tetrahydro-7-methyl-3H-s-triazolo[4,3-d][1,4]benzodiazepin-3-one A stirred mixture of 7-chloro-5-ethoxy-2,3-dihydro-1-methyl-1H-1,4-benzodiazepine (4.76 g., 0.0200 mole), ethyl carbazate (6.24 g., 0.0600 mole) and ethanol (100 ml.) was refluxed for 24 hours under nitrogen and concentrated in vacuo. Crystallization of the residue from methanolethylacetate gave 2.40 g. (41.5%) of 10-chloro-2,5,6,7-tetrahydro - 7 - methyl-3H-s-triazolo[4,3-d][1,4]benzodiazepin-3-one of melting point 260.5–264° C. The analytical sample had a melting point of 259–262° C.

*Analysis.*—Calcd. for $C_{11}H_{11}ClN_4O$ (percent): C, 52.70; H, 4.42; Cl, 14.14; N, 22.35. Found (percent): C, 25.67; H, 4.58; Cl, 14.20; N, 22.27.

EXAMPLE 2

10-nitro-2,5,6,7-tetrahydro-5,7-diethyl-3H-s-triazolo[4,3-d][1,4]benzodiazepin-3-one In the manner given in Example 1, 7-nitro-5-methoxy-2,3-dihydro-1,3-diethyl-1H-1,4-benzodiazepine was heated with ethyl carbazate in methanol to give 10-nitro-2,5,6,7-tetrahydro - 5,7 - diethyl-3H-s-triazolo[4,3-d][1,4]benzodiazepin-3-one.

EXAMPLE 3

8-cyano-2,5,6,7-tetrahydro-7-propyl-3H-s-triazolo-[4,3-d][1,4]benzodiazepin-3-one In the manner given in Example 1, 9-cyano-2,3-dihydro-5-ethoxy-1-propyl-1H-1,4-benzodiazepine was heated with methyl carbazate in methanol to give 8-cyano-2,5,6,7-tetrahydro - 7 - propyl-3H-s-triazolo[4,3-d][1,4]benzodiazepin-3-one.

EXAMPLE 4

9-fluoro-2,5,6,7-tetrahydro-7-propyl-3H-s-triazolo-[4,3-d][1,4]benzodiazepin-3-one In the manner given in Example 1, 8-fluoro-2,3-dihydro-5-ethoxy-1-propyl-1H-1,4-benzodiazepine was heated with propyl carbazate in 1-propanol to give 9-fluoro-2,5,6,7 - tetrahydro - 7 - propyl-3H-s-triazolo[4,3-d][1,4]benzodiazepin-3-one.

EXAMPLE 5

11-bromo-2,5,6,7-tetrahydro-7-methyl-3H-s-triazolo-[4,3-d][1,4]benzodiazepin-3-one In the manner given in Example 1, 6-bromo-1-methyl-2,3-dihydro-5-propoxy-1H-1,4-benzodiazepine was heated with ethyl carbazate in methanol to give 11-bromo-2,5,6,7-tetrahydro - 7 - methyl - 3H-s-triazolo[4,3-d][1,4]benzodiazepin-3-one.

EXAMPLE 6

10-ethoxy-2,5,6,7-tetrahydro-5,7-dipropyl-3H-s-triazolo-[4,3-d][1,4]benzodiazepin-3-one In the manner given in Example 1, 7-ethoxy-2,3-dihydro-1,3-dipropyl-5-propoxy-1H-1,4-benzodiazepine was heated with ethyl carbazate in methanol to give 10-ethoxy-2,5,6,7 - tetrahydro - 5,7 - dipropyl - 3H-s-triazolo[4,3-d]-[1,4]benzodiazepin-3-one.

EXAMPLE 7

10-trifluoromethyl-2,5,6,7-tetrahydro-7-methyl-3H-s-triazolo[4,3-d][1,4]benzodiazepin-3-one In the manner given in Example 1, 7-trifluoromethyl-2,3 - dihydro - 1 - methyl-5-methoxy-1H-1,4-benzodiazepine was heated with ethyl carbazate in benzene to give 10 - trifluoromethyl - 2,5,6,7 - tetrahydro-7-methyl-3H-s-triazolo[4,3-d][1,4]benzodiazepine-3-one.

EXAMPLE 8

8-methoxy-2,5,6,7-tetrahydro-7-isopropyl-3H-s-triazolo-[4,3-d][1,4]benzodiazepin-3-one In the manner given in Example 1, 9-methoxy-2,3-dihydro - 1 - isopropyl-5-ethoxy-1H-1,4-benzodiazepine was heated with ethyl carbazate in toluene to give 8-methoxy-2,5,6,7 - tetrahydro - 7 - isopropyl-3H-s-triazolo[4,3-d]-[1,4]benzodiazepin-3-one.

EXAMPLE 9

9-propylthio-2,5,6,7-tetrahydro-7-ethyl-3H-s-triazolo-[4,3-d][1,4]benzodiazepin-3-one In the manner given in Example 1, 8-propylthio-2,3-dihydro - 1 - ethyl-5-methoxy-1H-1,4-benzodiazepine was heated with methyl carbazate in ethanol to give 9-propylthio - 2,5,6,7 - tetrahydro - 7 - ethyl-3H-s-triazolo-[4,3-d][1,4]benzodiazepin-3-one.

EXAMPLE 10

9-ethyl-2,5,6,7-tetrahydro-7-propyl-3H-s-triazolo-[4,3-d][1,4]benzodiazepin-3-one In the manner given in Example 1, 8-ethyl-2,3-dihydro-1-propyl-5-isopropoxy-1H-1,4-benzodiazepine was heated with isopropylcarbazate in 2-propanol to give 9-ethyl-2,5,6,7 - tetrahydro - 7 - propyl-3H-s-triazolo[4,3-d][1,4]benzodiazepine-3-one.

In the manner illustrated by the preceding example, other 2,5,6,7 - tetrahydro - 7-alkyl-3H-s-triazolo[4,3-d]-[1,4]benzodiazepin-3-ones can be produced by reaction of a selected 1 - alkyl-5-alkoxy-2,3-dihydro-1H-1,4-benzodiazepine with a lower alkyl carbazate. Representative compounds, thus produced, include:

11-iodo-7-methyl-2,5,6-7-tetrahydro-3H-s-triazolo[4,3-d]-[1,4]benzodiazepin-3-one;

8-bromo-7-isopropyl-2,5,6,7-tetrahydro-3H-s-triazolo-[4,3-d][1,4]benzodiazepin-3-one;
9-cyano-7-ethyl-2,5,6,7-tetrahydro-3H-s-triazolo[4,3-d]-[1,4]benzodiazepin-3-one;
9-nitro-7-ethyl-2,5,6,7-tetrahydro-3H-s-triazolo[4,3-d]-[1,4]benzodiazepin-3-one;
8-isopropyl-7-methyl-2,5,6,7-tetrahydro-3H-s-triazolo-[4,3-d][1,4]benzodiazepine-3-one;
10-propylthio-7-methyl-2,5,6,7-tetrahydro-3H-s-triazolo-[4,3-d][1,4]benzodiazepin-3-one;
9-isopropylthio-7-ethyl-2,5,6,7-tetrahydro-3H-s-triazolo-[4,3-d][1,4]benzodiazepin-3-one;
8-isopropyl-7-methyl-2,5,6,7-tetrahydro-3H-s-triazolo-[4,3-d][1,4]benzodiazepin-3-one;
11-fluoro-7-ethyl-2,5,6,7-tetrahydro-3H-s-triazolo[4,3-d]-[1,4]benzodiazepin-3-one;
10-bromo-7-propyl-2,5,6,7-tetrahydro-3H-s-triazolo-[4,3-d][1,4]benzodiazepin-3-one;
and the like.

Treating the compounds of Formula II with pharmacologically acceptable acids such as hydrochloric, hydrobromic, phosphoric, sulfuric, acetic, propionic, toluenesulfonic, methanesulfonic, tartaric, citric, lactic, malic, maleic, cyclohexanesulfamic acids produces the pharmacologically acceptable salts of these compounds of Formula II which can be used like the free base compounds of Formula II. Salt formation is achieved in conventional manner by reacting the compounds of Formula II with excess of a selected acid in a suitable medium e.g. water, a lower alkanol, ether, or acetone and recovering the salt by evaporating the solvent, preferably in vacuo.

What is claimed is:

1. A compound selected from the group consisting of 2,5,6,7 - tetrahydro - 7 - alkyl - 3H - s - triazolo[4,3-d][1,4]benzodiazepin-3-ones of the Formula II:

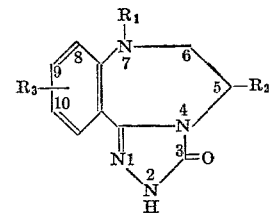

II wherein $R_1$ is alkyl of 1 to 3 carbon atoms, inclusive; wherein $R_2$ is hydrogen or alkyl defined as above; wherein $R_3$ is selected from the group consisting of hydrogen, alkyl as defined above, alkoxy of 1 to 3 carbon atoms, fluoro, chloro, bromo, iodo, nitro, cyano, trifluoromethyl, and alkylthio of 1 to 3 carbon atoms, inclusive, and the pharmacologically acceptable acid addition salts thereof.

2. A compound of claim 1 wherein $R_1$ is methyl, $R_2$ is hydrogen, $R_3$ is 10-chloro, and the compound is therefore 10 - chloro - 2,5,6,7 - tetrahydro - 7 - methyl-3H-s-triazolo[4,3-d][1,4]benzodiazepin-3-one.

3. The compound of claim 1, wherein $R_1$ and $R_2$ are ethyl, $R_3$ is 10-nitro, and the compound is therefore 10-nitro - 2,5,6,7 - tetrahydro - 5,7 - diethyl - 3H - s-triazolo-[4,3-d][1,4]benzodiazepin-3-one.

4. A process for the preparation of 2,5,6,7-tetrahydro-7-alkyl-3H-s-triazolo[4,3-d][1,4]benzodiazepin - 3 - one of the Formula II:

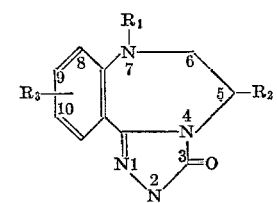

II wherein $R_1$ is alkyl of 1 to 3 carbon atoms, inclusive; wherein $R_2$ is hydrogen or alkyl defined as above; wherein $R_3$ is selected from the group consisting of hydrogen, alkyl as defined above, alkoxy of 1 to 3 carbon atoms, fluoro, chloro, bromo, iodo, nitro, cyano, trifluoromethyl, and alkylthio of 1 to 3 carbon atoms, inclusive, which comprises: treating a 1-alkyl-5-alkoxy-2,3-dihydro-1H-1,4-benzodiazepine of Formula I:

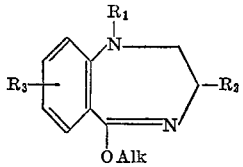

wherein $R_1$, $R_2$, and $R_3$ have the significance of above and Alk is alkyl defined as above with a lower alkyl carbazate at 60–120°, in an organic solvent to obtain the compound of Formula II.

5. The process of claim 4 wherein the starting material (I) is 7 - chloro - 1 - methyl - 5 - ethoxy-2,3-dihydro-1H-1,4-benzo-diazepine.

6. The process of claim 5 wherein the solvent is ethanol and the carbazate is ethyl carbazate.

References Cited
UNITED STATES PATENTS 3,646,055  2/1972  Hester _____ 260—308 C ALTON D. ROLLINS, Primary Examiner U.S. Cl. X.R.

71—92; 99—2 G, 2 T; 260—239 BD, 239.3 D, 244 A, 558 A, 559 A; 424—184, 269